(12) United States Patent
Connor, Jr.

(10) Patent No.: US 8,122,567 B2
(45) Date of Patent: *Feb. 28, 2012

(54) FLOOR MAT CLIP ASSEMBLY

(76) Inventor: Mark A. Connor, Jr., Toledo, OH (US)

( * ) Notice: Subject to any disclaimer, the term of this patent is extended or adjusted under 35 U.S.C. 154(b) by 390 days.

This patent is subject to a terminal disclaimer.

(21) Appl. No.: 12/478,467

(22) Filed: Jun. 4, 2009

(65) Prior Publication Data

US 2009/0235485 A1 Sep. 24, 2009

Related U.S. Application Data

(63) Continuation-in-part of application No. 12/164,375, filed on Jun. 30, 2008, now Pat. No. 7,546,661.

(60) Provisional application No. 60/948,066, filed on Jul. 5, 2007.

(51) Int. Cl.
*A47G 27/04* (2006.01)

(52) U.S. Cl. ............... 16/4; 411/344; 411/555; 24/297

(58) Field of Classification Search ............... 16/4, 6, 16/8; 411/344, 508, 509, 553, 555, 913; 24/297, 662, 90.5

See application file for complete search history.

(56) References Cited

U.S. PATENT DOCUMENTS

| | | |
|---|---|---|
| 1,176,619 A | 3/1916 | Sykes |
| 3,407,454 A | 10/1968 | Myatt |
| 4,778,320 A | 10/1988 | Nakama |
| 4,878,792 A | 11/1989 | Frano |
| 5,178,504 A | 1/1993 | Falchi |
| 5,195,857 A | 3/1993 | Hiramoto |
| 5,362,187 A | 11/1994 | Scalise |
| 5,511,919 A | 4/1996 | Scalise |
| 5,775,859 A | 7/1998 | Anscher |
| 6,381,806 B1 | 5/2002 | Stanesic et al. |
| 6,612,795 B2 | 9/2003 | Kirchen |
| 6,735,819 B2 | 5/2004 | Iverson et al. |
| 6,757,945 B2 | 7/2004 | Shibuya et al. |
| 7,908,708 B2 * | 3/2011 | Gelb et al. ............... 16/4 |

FOREIGN PATENT DOCUMENTS

| | | |
|---|---|---|
| DE | 200 01 405 U1 | 4/2000 |
| DE | 296 24 346 U1 | 8/2002 |
| DE | 196 17 408 C2 | 2/2003 |
| GB | 2236141 A | 3/1991 |
| WO | WO 00/55007 | 9/2000 |
| WO | WO 01/36227 | 5/2001 |

\* cited by examiner

*Primary Examiner* — William L. Miller

(74) *Attorney, Agent, or Firm* — Fraser Clemens Martin & Miller LLC; J. Douglas Miller

(57) ABSTRACT

A floor mat clip assembly adapted to attach a floor mat to the interior carpet of a vehicle is disclosed. The clip assembly includes a floor clip attached to the carpet and a mat clip attached to the floor mat. The floor clip includes a base member and a top member having a locking member rotatably attached thereto. The base and top member of the floor clip are adapted to cut through the carpet and interlock to sandwich the carpet therebetween. The mat clip includes a top member and a base member, each having an aperture and adapted to interlock to sandwich the mat therebetween. The mat can then be positioned to insert the locking member of the floor clip through the aperture of the mat clip. A subsequent rotation of the locking member locks together the respective clips to secure the floor mat to the interior carpet.

20 Claims, 4 Drawing Sheets

FLOOR MAT CLIP ASSEMBLY

CROSS-REFERENCE TO RELATED APPLICATION

This application is a continuation-in-part of Ser. No. 12/164,375, filed Jun. 30, 2008, now U.S. Pat. No. 7,546,661, issued Jun. 16, 2009, which claims the benefit of U.S. Provisional Patent Application Ser. No. 60/948,066 filed on Jul. 5, 2007, each of which is incorporated herein by reference in its entirety.

FIELD OF THE INVENTION

The present invention relates to a floor mat clip assembly, and more specifically to a pair of cooperating clips adapted to attach a floor mat to the interior carpeting of a vehicle.

BACKGROUND OF THE INVENTION

Floor mats are a typical accessory for vehicles. Floor mats serve to protect the more permanently installed carpet or other flooring material of the vehicle. The floor mats are typically arranged so that the feet of the occupants of the vehicle rest on the floor mat rather than the installed flooring material. Dirt and moisture that may have accumulated on the shoes of the occupants is received by the floor mat rather than the installed flooring material, thus facilitating the preservation of the installed flooring. The floor mats may be removed from the vehicle as desired to vacuum or wash in an effort to remove any dirt that accumulates thereon.

The purpose of the floor mat is to protect the installed flooring from dirt and moisture, but often times this purpose is not achieved. If the floor mat is displaced from its intended position, it will no longer be situated in a position for the feet of an occupant to rest thereon. The feet of the occupants will instead rest on the installed flooring material causing any dirt or moisture on the shoes of the occupants to be transferred to the installed flooring. Accordingly, it is desirable to maintain the floor mat at its intended position. However, the method used to maintain the desired position of the floor mat must allow for the floor mat to be easily removed for cleaning or the purpose of the floor mat will be defeated.

Various fasteners have been employed to facilitate maintaining a floor mat at its intended position. For example U.S. Pat. No. 6,735,819 to Iverson et. al. discloses a hand mountable device for affixing a carpet mat to the carpeting of an automobile. Additionally, U.S. Pat. No. 4,878,792 to Frano discloses a removable floor mat fastener. These and other fasteners typically have not achieved a maximized balancing of the two competing objectives for such fasteners, namely to secure the mat at its intended location and allow for the easy removal of the mat for cleaning. The current fasteners typically do not adequately secure the floor mat to the underlying flooring or, alternatively, secure the floor mat semi-permanently making it necessary to use tools or other cumbersome procedures to disengage the fastener from the floor mat and remove the floor mat.

Vehicle manufactures often include such fasteners for the floor mats of a new vehicle. The vehicle manufacturer has a need for the fasteners to facilitate an efficient installation thereof to minimize the overall assembly cost of the automobile. Additionally, the vehicle manufacturer typically requires the cost of the fastener be minimized while maintaining the functions of securing the floor mat at the desired location and allowing easy removal and reattachment of the floor mat.

It would be desirable to provide a floor mat clip that secures a floor mat to an underlying flooring material at an intended location; facilitates the removal and reattachment of the floor mat to the underlying flooring material; facilitates the installation thereof into the floor mat and the underlying flooring material; and may be economically manufactured.

SUMMARY OF THE INVENTION

Compatible and attuned with the present invention, a floor mat clip that secures a floor mat to an underlying flooring material at an intended location; facilitates the removal and reattachment of the floor mat to the underlying flooring material; facilitates the installation thereof into the floor mat and the underlying flooring material, and may be economically manufactured, has surprisingly been discovered.

In one embodiment, a floor mat clip assembly for attaching a floor mat to an underlying flooring material comprises a floor clip having a base member and a cooperating top member, the base member including an opening formed therein, the top member including a lower surface with a boss depending therefrom and an upper surface having an upstanding boss with a locking member attached thereto, wherein the boss depending from the top member is received in the opening in the base member to join the top member to the base member and secure the underlying flooring material therebetween; and a mat clip having a base member and a cooperating top member, the base member including an aperture having at least one detent extending upwardly therefrom, the top member including an upper surface having a recessed portion with an aperture formed therein, and a lower surface having at least one detent depending therefrom adjacent a periphery of the aperture of the top member, wherein the detent of the base member and the detent of the top member cooperate to join the top member to the base member and secure the floor mat therebetween, the upstanding boss and the locking member of the floor clip adapted to be received by the apertures in the mat clip and facilitate a manipulation of the locking member to secure the mat clip to the floor clip.

In another embodiment, a floor mat clip assembly for attaching a floor mat to an underlying flooring material comprises a floor clip having a base member and a cooperating top member, the base member including a generally circular opening formed therein, the top member including a lower surface with a generally annular hollow boss depending therefrom, and an upper surface having an upstanding oblong boss with an aperture formed therein for rotatably attaching a locking member thereto, wherein the annular boss depending from the top member is received in the circular opening in the base member to join the top member to the base member and secure the underlying flooring material therebetween; and a mat clip having a base member and a cooperating top member, the base member including an oblong aperture having a plurality of detents extending upwardly therefrom, the top member including an upper surface having an annular recessed portion with an oblong aperture formed therein and a lower surface having a plurality of detents depending therefrom adjacent a periphery of the oblong aperture of the top member, wherein the detents of the top member are received within the detents of the base member to join the top member to the base member and secure the floor mat therebetween, the upstanding boss and the locking member of the floor clip adapted to be received by the oblong apertures in the mat clip and facilitate a manipulation of the locking member to secure the mat clip to the floor clip.

In another embodiment, a flooring system comprises an underlying flooring material and an overlying floor mat removably attached thereto; a floor clip secured to the underlying flooring material having a base member and a cooperating top member, the base member including an opening formed therein, the top member including a lower surface with a hollow boss depending therefrom and an upper surface having an upstanding boss with a locking member attached thereto, wherein the boss depending from the top member is received in the opening in the base member to join the top member to the base member and secure the underlying flooring material therebetween; and a mat clip secured to the overlying floor mat having a base member and a cooperating top member, the base member including an aperture formed therein having a plurality of detents extending upwardly therefrom, the top member including an upper surface having a recessed portion with an aperture formed therein and a lower surface having a plurality of detents depending therefrom adjacent a periphery of the aperture, wherein the detents of the top member and the detents of the base member cooperate to join the top member to the base member and secure the floor mat therebetween, the upstanding boss and the locking member of the floor clip adapted to be received by the aperture in the mat clip and facilitate a manipulation of the locking member to removably attach the overlying mat to the underlying flooring material.

BRIEF DESCRIPTION OF THE DRAWINGS

The above, as well as other advantages of the invention, will become readily apparent to those skilled in the art from the following detailed description of an embodiment of the invention when considered in the light of the accompanying drawings, in which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
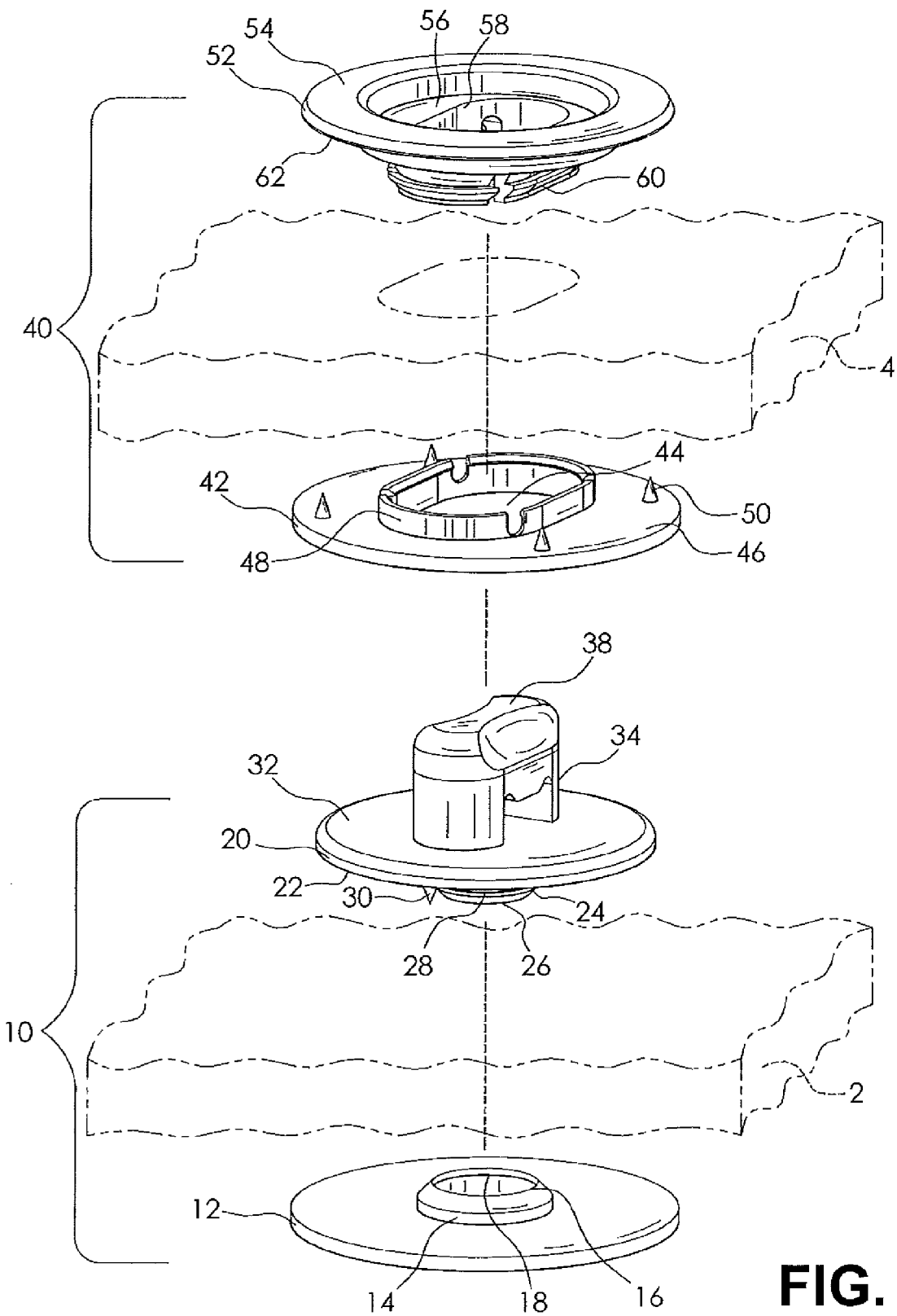
FIG. 1 is an exploded perspective view of a floor mat clip assembly according to an embodiment of the invention with an associated flooring material and an overlying floor mat shown in phantom.
Figure 2:
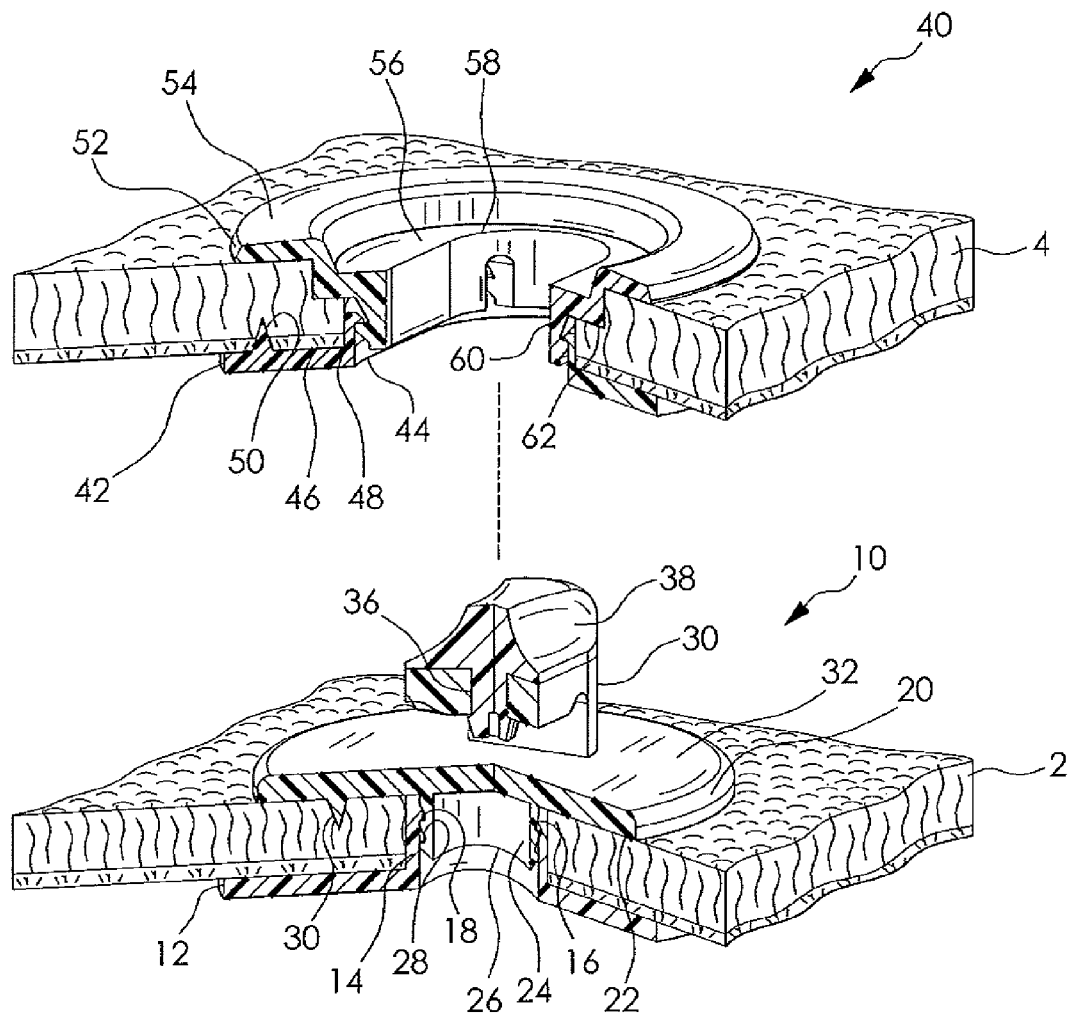
FIG. 2 is an exploded perspective view in partial section of the floor mat clip assembly with the associated flooring material and the overlying floor mat.
Figure 3:
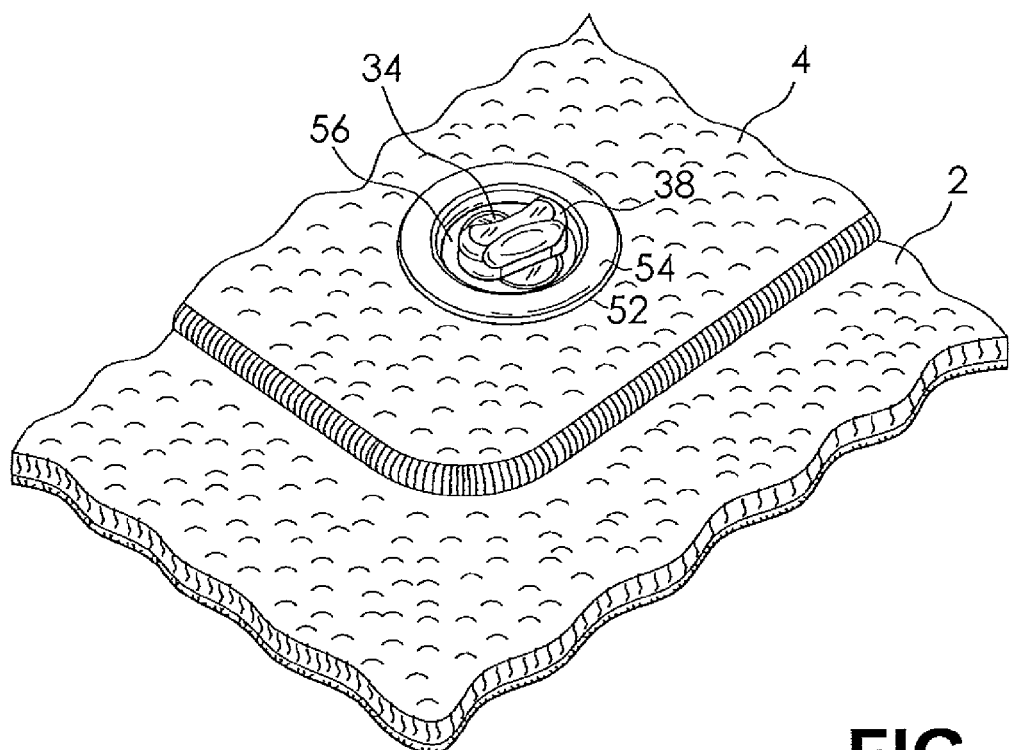
FIG. 3 is a perspective view of the floor mat clip assembly showing the overlying floor mat attached to the flooring material.

A floor mat clip assembly for securing a floor mat 4 to a flooring material 2 of a vehicle such as carpeting, for example, is illustrated in FIGS. 1-3. The assembled floor mat clip includes a floor clip, generally indicated by reference numeral 10, and a mat clip, generally indicated by reference numeral 40.

The floor clip 10 includes a base member 12 and a top member 20. The base member 12 of the floor clip 10 includes an upwardly extending hollow boss 14 terminating at a cutting edge 16. An annular detent 18 is formed on an inner surface of the boss 14.

The top member 20 includes a lower surface 22 with a downwardly depending hollow boss 24 terminating at a cutting edge 26. Annular detents 28 are formed on an outer surface of the boss 24. Protuberances 30 may be provided that depend from the lower surface 22 of the top member 20 to militate against relative rotation of the floor clip 10 in respect of the flooring material 2. Favorable results have been obtained employing a height of between about 2 to 5 millimeters in respect of the lower surface 22 for the protuberances 30.

The upper surface 32 of the top member 20 has a centrally located upstanding oblong boss 34 including an aperture 36 therein. The aperture 36 is adapted to rotatably receive an oblong locking member 38. It should be understood that other shapes may be employed for the boss 34 and the locking member 38 as desired.

In assembling the floor clip 10 to the flooring material 2, the top member 20 is positioned with the lower surface 22 facing an upper surface of the flooring material 2. The base member 12 is positioned on an underside of the flooring material 2 with the boss 14 in substantial alignment with the boss 24 of the top member 20 at a desired location in respect of the flooring material 2. The base member 12 and the top member 20 and are urged together causing the cutting edges 16, 26 of the base member 12 and the top member 20, respectively, to cut through the flooring material 2. The boss 24 of the top member 20 is received within the boss 14 of the base member 12. The detents 18, 28 of the base member 12 and the top member 20, respectively, interlock to snap fit the top member 20 to the base member 12 and sandwich the flooring material 2 therebetween.

The mat clip 40 includes a base member 42 and a top member 52. The base member 42 of the mat clip 40 includes a centrally located oblong shaped aperture 44 formed therein. An upper surface 46 of the base member 42 includes detents 48 which extend upwardly from a periphery of the oblong aperture 44. Protuberances 50 may be provided that extend upwardly from the upper surface 46 of the base member 42 to militate against relative rotation of the mat clip 40 in respect of the floor mat 4. Favorable results have been obtained employing a height of about 2.5 millimeters in respect of the upper surface 46 for the protuberances 50.

The top member 52 has an upper surface 54 including a recessed portion 56 having an oblong aperture 58 formed therein. It should be understood that other shapes can be used for the apertures 44, 58 provided the shapes of the apertures 44, 58 are adapted to cooperate with each other to receive the upstanding boss 34 and the locking member 38 of the first clip 10. Detents 60 are formed on a lower surface 62 of the top member 52 which depend therefrom adjacent a periphery of the oblong aperture 58.

Figure 4:
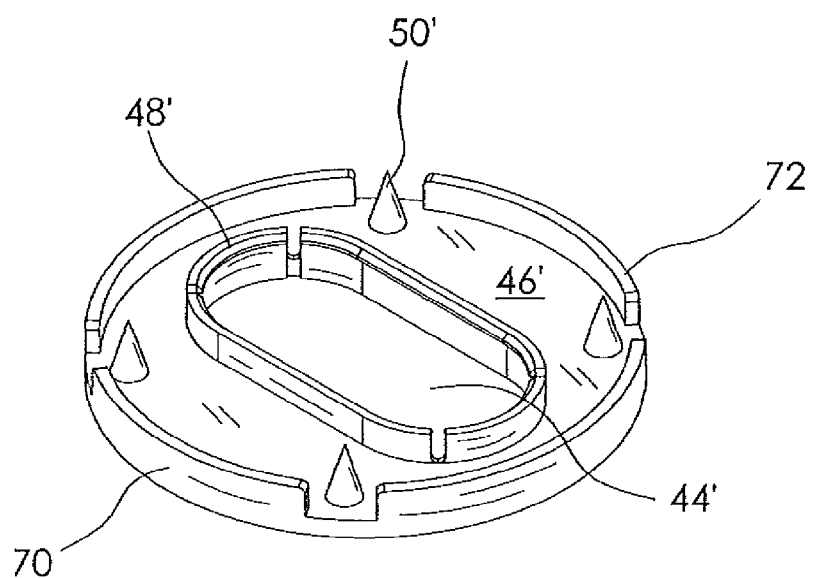
FIG. 4 is a perspective view of a base member of the floor mat clip assembly illustrated in FIGS. 1-3 according to another embodiment of the invention.

A base member 70 illustrated in FIG. 4 shows an alternative embodiment of the base member 54 for the mat clip 40. Similar structural features of the base member 70 include the same reference numeral and a prime (') symbol. The base member 70 of the mat includes a centrally located oblong shaped aperture 44' formed therein. An upper surface 46' of the base member 70 includes detents 48' which extend upwardly from a periphery of the oblong aperture 44'. Protuberances 50' may be provided that extend upwardly from the upper surface 46' of the base member 70 to militate against relative rotation of the mat clip 40 in respect of the floor mat 4. Favorable results have been obtained employing a height of between about 2 to 6 millimeters for the protuberances 50'. Wall sections 72 are formed on the upper surface 46' of the base member 70 and extend upwardly therefrom to militate against relative rotation of the mat clip 40 in respect of the floor mat 4. It has been found that the wall sections 72 are especially effective to militate against a relative rotation of the mat clip 40 in respect of a floor mat having a minimal thickness. Favorable results have been obtained employing four wall sections 72 having a height of about 2.5 millimeters in respect of the upper surface 46'. It should be understood that additional or fewer wall sections 72 may be provided, and that taller or shorter wall sections may be employed. Additionally, it has been found that employing the wall sections 72 together with four protuberances 50' having a height of about 4.5 millimeters in respect of the upper surface 46' maximizes a resistance to relative rotation of the mat clip 40 in respect of the floor mat 4. The remaining structure and function of the base member 70 is substantially the same as the base member 42 described herein.

The assembly of the mat clip 40 is accomplished by initially cutting an opening in the floor mat 4. The opening is formed to substantially match the outer periphery of the apertures 44, 58 in the base member 42 and the top member 52, respectively. The detents 48, 60 of the base member 42 and the top member 52, respectively, are forced through the opening of the floor mat 4 from a top side and a bottom side of the floor mat 4, respectively. The detents 60 are thence received by the detents 48 of the base member 42. The detents 48, 60 of the interlock to snap fit the top member 52 to the base member 42 and sandwich the floor mat 4 therebetween.

In the final assembly, the floor clip 10 and mat clip 40 are locked together to secure the floor mat 4 to the flooring material 2. The oblong apertures 44, 58 of the mat clip 40 attached to the floor mat 4 are positioned over the floor clip 10 attached to the flooring material 2. The upstanding oblong boss 34 and locking member 36 of the floor clip 10 extends through the oblong apertures 44, 58 of the mat clip 40. The locking member 38 is rotated through ninety degrees effectively locking the clips 10, 40 together and securing the floor mat 4 to the flooring material 2 in the final assembled form shown in FIG. 3. It should be understood that a plurality of the floor mat clip assemblies may be employed to secure a single floor mat 4, and typically at least two floor mat clip assemblies would be employed to secure the floor mat 4 at its desired location in respect of the flooring material 2.

Favorable results have been obtained by employing an injection molding process to form the members 12, 20, 42, 52 of the floor clip assembly. It should be understood that other methods now known or later discovered may be employed to form the members 12, 20, 42, 52. Additionally it has been found that the material Polyamide 6, also known as PA6 or Nylon 6, provides desired physical properties to the members 12, 20, 42, 52. However, it should be understood that other materials having suitable physical properties may be employed to form the members 12, 20, 42, 52.

Figure 5:
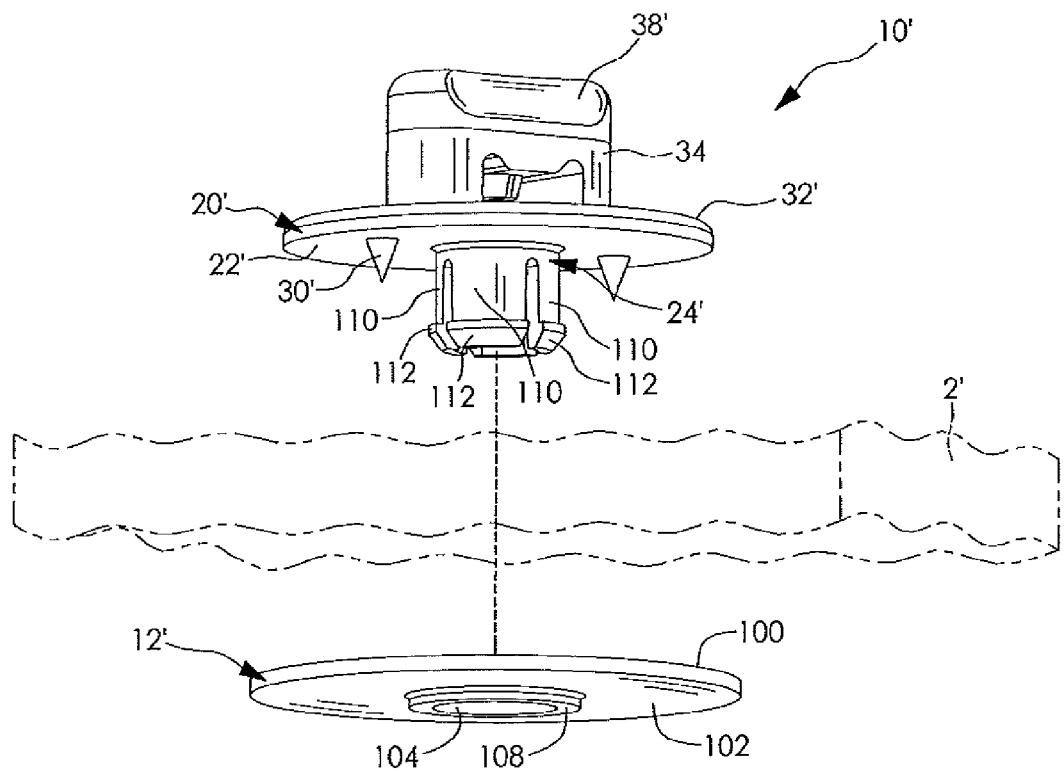
FIG. 5 is an exploded perspective view of a floor clip of the floor mat clip assembly illustrated in FIGS. 1-3 according to another embodiment of the invention.
Figure 6:
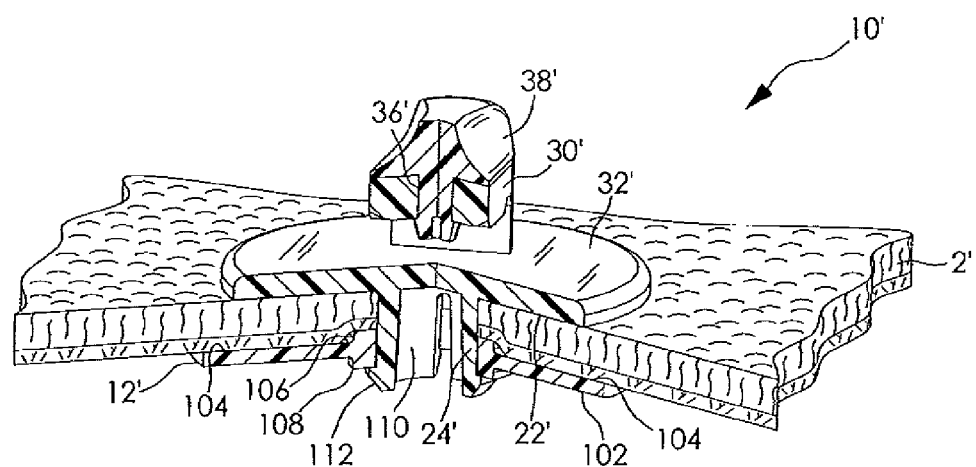
FIG. 6 is a fragmentary perspective view partially in section of the floor clip illustrated in FIG. 5 with an associated flooring material.

FIGS. 5-6 illustrate another embodiment of the floor clip 10. Structure similar to that of the floor clip 10 illustrated in FIGS. 1-3 includes the same reference numeral and a prime (') symbol for clarity. The floor clip 10' includes a base member 12' and a top member 20'. The base member 12' of the floor clip 10' includes a first surface 100 and a spaced apart second surface 102. A circular opening 104 is formed in the base member 12'. Annular lips 106, 108 are formed on and extend outwardly from the first surface 100 and the second surface 102, respectively, circumscribe the opening 104.

The top member 20' includes a lower surface 22' with a downwardly depending hollow boss 24' having four flexible fingers 110. It should be understood that two or more flexible fingers 110 can be employed, as desired. Each of the fingers 110 includes a detent 112 formed on a distal end thereof. It should be understood that the detent 112 can be formed on selected fingers 110, as desired, wherein at least two of the fingers 110 include the detent 112. Protuberances 30' may be provided that depend from the lower surface 22' of the top member 20' to militate against rotation of the floor clip 10' in respect of the flooring material 2'. Favorable results have been obtained employing protuberances 30' having a length of between about 2 to 5 millimeters.

The upper surface 32' of the top member 20' has a centrally located upstanding oblong boss 34' including an aperture 36' therein. The aperture 36' is adapted to rotatably receive an oblong locking member 38'. It should be understood that other shapes may be employed for the boss 34' and the locking member 38' as desired.

To assemble the floor clip 10' to the flooring material 2', an aperture is formed in the flooring material 2' at a desired location for the floor clip 10'. The top member 20' is positioned with the lower surface 22' facing an upper surface of the flooring material 2'. The boss 24' of the top member 20' is inserted through the aperture formed in the flooring material 2'. The base member 12' is positioned on an underside of the flooring material 2' with the opening 108 in substantial alignment with the boss 24'. The base member 12' and the top member 20' and are urged together, wherein the boss 24' of the top member is received within the opening 104 of the base member 12'. The detents 112 of the fingers 110 contact the annular lip 106 causing the fingers 110 to flex radially inwardly, thus reducing an outer diameter of the boss 24' at the detents 112 to allow the boss 24' to be received within the opening 108 of the base member 12'. The base member 12' and the top member 20' and are urged together further, causing the detents 112 to emerge from the opening 108 on the second side 102 of the base member 12'. Upon the emergence of the detents 112 from the opening 108, the outer diameter of the boss 24' substantially returns to an original diameter, wherein the detents 112 and the annular lip 108 cooperate to snap fit the top member 20' to the base member 12' and sandwich the flooring material 2 therebetween. It should be understood that the base member 12' can be oriented with either the first surface 100 or the second surface 102 facing the underside of the flooring material 2'. The final assembly of the floor clip 10' to the mat clip 40 is substantially the same as previously described herein for the floor clip 10 illustrated in FIGS. 1-3.

In use the floor mat clip assembly secures the floor mat 4 to the flooring material 2 of the vehicle in a location where the shoes of passengers therein will rest on the floor mat 4 rather than the underlying flooring material 2. Any dirt, moisture, and other contaminants that typically accumulate on the shoes will not contact the flooring material 2, but instead be collected by the floor mat 4, thus facilitating the preservation of the flooring material 2 in an unsoiled condition. The floor mat clip assembly allows for an ease of removal of the floor mat 4 from the vehicle to clean, for example, by a rotation of the locking member 38 and lifting of the floor mat 4 to disengage the mat clip 40 from the floor clip 10. No tools or other cumbersome procedures are required to disengage the mat clip 40 from the floor clip 10 and remove the floor mat 4 from the vehicle.

The floor mat clip illustrated and described herein provides a low cost method of securing the floor mat 4 to the flooring material 2 of a vehicle. Additionally, the cutting edges 16, 26 of the floor clip 10 facilitate the installation of the floor clip 10 to the flooring material 4; thus, reducing the costs associated with the installation of the floor clip 10 during the assembly process of a new vehicle.

From the foregoing description, one ordinarily skilled in the art can easily ascertain the essential characteristics of this invention, and without departing from the spirit and scope thereof, can make various changes and modifications to the invention to adapt it to various usages and conditions.

What is claimed is:

1. A floor mat clip assembly for attaching a floor mat to an underlying flooring material comprising:
   a floor clip having a base member and a cooperating top member, the base member including an opening formed therein, the top member including a lower surface with a boss depending therefrom and an upper surface having an upstanding boss with a locking member attached thereto, wherein the boss depending from the top member is received in the opening in the base member to join the top member to the base member and secure the underlying flooring material therebetween; and
   a mat clip having a base member and a cooperating top member, the base member including an aperture having at least one detent extending upwardly therefrom, the top member including an upper surface having a recessed portion with an aperture formed therein, and a lower surface having at least one detent depending therefrom adjacent a periphery of the aperture of the top member, wherein the detent of the base member and the detent of the top member cooperate to join the top member to the base member and secure the floor mat therebetween, the upstanding boss and the locking member of the floor clip adapted to be received by the apertures in the mat clip and facilitate a manipulation of the locking member to secure the mat clip to the floor clip.

2. The floor mat clip assembly according to claim 1, wherein the boss depending from the top member of the floor clip is substantially annular and the opening in the base member of the floor clip is substantially circular.

3. The floor mat clip assembly according to claim 1, wherein the boss depending from the top member of the floor clip is received in the opening in the base member of the floor clip to snap fit the top member to the base member.

4. The floor mat clip assembly according to claim 1, wherein the base member of the floor clip includes a first surface and a spaced apart second surface, at least one of the first surface and the second surface having an annular lip formed thereon circumscribing the opening.

5. The floor mat clip assembly according to claim 1, wherein the boss depending from the top member of the floor clip includes a plurality of flexible fingers, at least two of the fingers having a detent formed on a distal end thereof.

6. The floor mat clip assembly according to claim 1, further comprising at least one protuberance depending from the lower surface of the top member of the floor clip.

7. The floor mat clip assembly according to claim 1, wherein the upstanding boss and the locking member of the floor clip have a generally oblong shape.

8. The floor mat clip assembly according to claim 1, wherein the locking member of the floor clip is rotatably attached to the upstanding boss.

9. The floor mat clip assembly according to claim 1, wherein the recessed portion of the top member of the mat clip is a generally annular recessed portion.

10. The floor mat clip assembly according to claim 1, wherein the aperture of the top member and the aperture of the base member of the mat clip have a generally oblong shape.

11. The floor mat clip assembly according to claim 1, wherein the detents of the top member of the mat clip are received within the detents of the base member of the mat clip to join the top member to the base member.

12. The floor mat clip assembly according to claim 1, wherein the detents of the top member of the mat clip and the detents of the base member of the mat clip cooperate to snap fit the top member to the base member.

13. The floor mat clip assembly according to claim 1, including at least one protuberance extending upwardly from the base member of the mat clip.

14. The floor mat clip assembly according to claim 1, including an upwardly extending wall formed adjacent an outer peripheral edge of the base member of the mat clip.

15. A floor mat clip assembly for attaching a floor mat to an underlying flooring material comprising:
   a floor clip having a base member and a cooperating top member, the base member including a generally circular opening formed therein, the top member including a lower surface with a generally annular hollow boss depending therefrom, and an upper surface having an upstanding oblong boss with an aperture formed therein for rotatably attaching a locking member thereto, wherein the annular boss depending from the top member is received in the circular opening in the base member to join the top member to the base member and secure the underlying flooring material therebetween; and
   a mat clip having a base member and a cooperating top member, the base member including an oblong aperture having a plurality of detents extending upwardly therefrom, the top member including an upper surface having an annular recessed portion with an oblong aperture formed therein and a lower surface having a plurality of detents depending therefrom adjacent a periphery of the oblong aperture of the top member, wherein the detents of the top member are received within the detents of the base member to join the top member to the base member and secure the floor mat therebetween, the upstanding boss and the locking member of the floor clip adapted to be received by the oblong apertures in the mat clip and facilitate a manipulation of the locking member to secure the mat clip to the floor clip.

16. The floor mat clip assembly according to claim 15, wherein the base member of the floor clip includes a first surface and a spaced apart second surface, at least one of the first surface and the second surface having an annular lip formed thereon circumscribing the opening.

17. The floor mat clip assembly according to claim 15, wherein the boss depending from the top member of the floor clip includes a plurality of flexible fingers, at least two of the fingers having a detent formed on a distal end thereof.

18. The floor mat clip assembly according to claim 15 including at least one protuberance depending from the lower surface of the top member of the floor clip, and at least one protuberance extending upwardly from the base member of the mat clip.

19. A flooring system comprising:
   an underlying flooring material and an overlying floor mat removably attached thereto;
   a floor clip secured to the underlying flooring material having a base member and a cooperating top member, the base member including an opening formed therein, the top member including a lower surface with a hollow boss depending therefrom and an upper surface having an upstanding boss with a locking member attached thereto, wherein the boss depending from the top member is received in the opening in the base member to join the top member to the base member and secure the underlying flooring material therebetween; and a mat clip secured to the overlying floor mat having a base member and a cooperating top member, the base member including an aperture formed therein having a plurality of detents extending upwardly therefrom, the top member including an upper surface having a recessed portion with an aperture formed therein and a lower surface having a plurality of detents depending therefrom adjacent a periphery of the aperture, wherein the detents of the top member and the detents of the base member cooperate to join the top member to the base member and secure the floor mat therebetween, the upstanding boss and the locking member of the floor clip adapted to be received by the aperture in the mat clip and facilitate a manipulation of the locking member to removably attach the overlying mat to the underlying flooring material.

20. The floor mat clip assembly according to claim 19, wherein the base member of the floor clip includes a first surface and a spaced apart second surface, at least one of the first surface and the second surface having an annular lip formed thereon circumscribing the opening, and the boss depending from the top member of the floor clip includes a plurality of flexible fingers, at least two of the fingers having a detent formed on a distal end thereof.

* * * * *